(12) United States Patent
Sakurai et al.

(10) Patent No.: US 12,552,967 B2
(45) Date of Patent: Feb. 17, 2026

(54) TRANSPARENT, HEAT RESISTIVE, ADHESIVE TAPE WITH ANTISTATIC PERFORMANCE AND METHOD OF USE THEREOF

(71) Applicant: 3M INNOVATIVE PROPERTIES COMPANY, St. Paul, MN (US)

(72) Inventors: Aizoh Sakurai, Tokyo (JP); Ching-Yi Liu, Zhunan Township (TW)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 168 days.

(21) Appl. No.: 18/284,250

(22) PCT Filed: Mar. 28, 2022

(86) PCT No.: PCT/IB2022/052846
§ 371 (c)(1),
(2) Date: Sep. 26, 2023

(87) PCT Pub. No.: WO2022/208317
PCT Pub. Date: Oct. 6, 2022

(65) Prior Publication Data
US 2024/0174897 A1    May 30, 2024

Related U.S. Application Data

(60) Provisional application No. 63/170,179, filed on Apr. 2, 2021.

(51) Int. Cl.
*C09J 7/29*        (2018.01)
*C09J 7/38*        (2018.01)

(52) U.S. Cl.
CPC ............... *C09J 7/29* (2018.01); *C09J 7/385* (2018.01); *C09J 2203/326* (2013.01);
(Continued)

(58) Field of Classification Search
CPC ........ C09J 7/29; C09J 7/385; C09J 2203/326; C09J 2301/314; C09J 2301/41;
(Continued)

(56) References Cited

U.S. PATENT DOCUMENTS 7,641,967 B2    1/2010    Shinohara et al.
7,799,853 B2    9/2010    Ukei et al.
(Continued)

FOREIGN PATENT DOCUMENTS

JP    2001172582 A    6/2001
JP    2008255345 A    10/2008
(Continued)

OTHER PUBLICATIONS

JP2014141649A Machine Translation of Description (Year: 2025).*
(Continued)

*Primary Examiner* — Cynthia L Schaller
(74) *Attorney, Agent, or Firm* — Jeffrey M. Olofson (57) ABSTRACT

A transparent heat resistive adhesive tape with antistatic performance and a method of use thereof are provided. The adhesive tape includes at least a transparent backing film layer, an electrically conductive transparent layer disposed on the backing film layer, and a transparent acrylic adhesive layer disposed on the electrically conductive transparent layer. The adhesive tape has heat resistivity and antistatic performance on an adhesive side of the tape while maintaining good optical transparency.

7 Claims, 7 Drawing Sheets

(52) U.S. Cl.
CPC ...... *C09J 2301/314* (2020.08); *C09J 2301/41* (2020.08); *C09J 2301/414* (2020.08); *C09J 2400/10* (2013.01); *C09J 2433/00* (2013.01); *C09J 2479/086* (2013.01); *C09J 2481/006* (2013.01)

(58) Field of Classification Search
CPC .............. C09J 2301/414; C09J 2400/10; C09J 2433/00; C09J 2479/086; C09J 2481/006; C09J 2301/312; C09J 2425/006; C09J 2467/006

See application file for complete search history.

(56) References Cited

U.S. PATENT DOCUMENTS

| | | | |
|---|---|---|---|
| 2003/0114560 A1 | 6/2003 | Yang et al. | |
| 2007/0104972 A1* | 5/2007 | Shinohara | C09J 7/385 428/40.1 |
| 2011/0014410 A1* | 1/2011 | Kishioka | C09J 7/10 428/41.8 |
| 2014/0011022 A1 | 1/2014 | Ukei et al. | |
| 2014/0134365 A1 | 5/2014 | Tanazawa et al. | |
| 2014/0295180 A1 | 10/2014 | Yamagata et al. | |

FOREIGN PATENT DOCUMENTS

| | | | |
|---|---|---|---|
| JP | 4451655 | B2 | 4/2010 |
| JP | 4610168 | B2 | 1/2011 |
| JP | 5008847 | B2 | 8/2012 |
| JP | 5220292 | B2 | 6/2013 |
| JP | 5382883 | B2 | 1/2014 |
| JP | 5384279 | B2 | 1/2014 |
| JP | 5437192 | B2 | 3/2014 |
| JP | 2014141649 A * | | 8/2014 |
| JP | 2017025258 A * | | 2/2017 |
| JP | 6500905 | B2 | 4/2019 |
| JP | 2019104245 A | | 6/2019 |
| WO | 2003011958 A1 | | 2/2003 |
| WO | 2014-103964 | | 7/2014 |
| WO | 2020136530 A1 | | 7/2020 |

OTHER PUBLICATIONS

JP2017025258A Machine Translation of Description (Year: 2025).*
International Search report for PCT International Application No. PCT/IB2022/052846, mailed on Jun. 28, 2022, 3 pages.

* cited by examiner

TRANSPARENT, HEAT RESISTIVE, ADHESIVE TAPE WITH ANTISTATIC PERFORMANCE AND METHOD OF USE THEREOF

FIELD OF THE DISCLOSURE

The present invention relates to a transparent, heat resistive adhesive tape that has antistatic performance and a method of use thereof.

BACKGROUND

Adhesive compositions exhibiting antistatic behavior or heat resistance are described in for example, Japanese Pat. Nos. JP4610168, JP4451655, JP5382883, JP5008847, JP5220292 and JP6500905. However, the prior disclosures do not provide a protective adhesive tape with the combined properties of heat resistance, electrical conductivity (e.g. antistatic behavior), and transparency, or provide adhesive tapes with these three combined properties having utility as a protective film, for protecting, for example, image sensor modules during an assembly process.

SUMMARY

The transparent heat resistant adhesive tapes of the present disclosure are suitable for use as protective tapes for a variety of substrates, including electronic devices and/or components. For some applications, it is desirable for the transparent heat resistant adhesive tapes to have a combination of heat resistivity, antistatic performance, and transparency. For example, during the fabrication of electronic connections of image sensor modules, the adhesive tapes require heat resistance and dimensional stability at the elevated process temperature, as the sensor modules are typically heated to a high temperature to make the connection. Second, antistatic performance is also an important feature to protect electronic components, e.g. an image sensor modules, from static charge build-up and to prevent the electronic component from adhering to unwanted substrates, such as a cover tape or tweezers, due to static electricity. Third, transparency through the thickness of the adhesive tape is important, enabling visual inspection of the protected electronic component.

In one embodiment, the present disclosure provides a transparent heat resistive adhesive tape with antistatic performance, including a transparent backing layer; an electrically conductive transparent layer disposed on the backing layer; a transparent acrylic adhesive layer disposed on the electrically conductive transparent layer, the acrylic adhesive layer containing a crosslinked mixture of monomers to impart heat resistance to the layer. The transparent heat resistive adhesive tape has a transparency of at least 30% over at least a portion of the wavelengths from 500 to 1600 nm and has a surface resistivity of less than about $10^{11}\Omega/sq$ or from about $10^7$ to about $10^{11}\Omega/sq$. for antistatic performance.

In another embodiment, the present disclosure provides a transparent heat resistive adhesive tape with antistatic performance including a transparent backing layer; an electrically conductive transparent layer disposed on the backing layer; a transparent acrylic adhesive layer disposed on the electrically conductive transparent layer, the acrylic adhesive layer containing a crosslinked mixture of monomers comprising 77 to 93 wt. % of alkyl (meth) acrylate, 0.1 to 13 wt. % of glycidyl (meth) acrylate and 1 to 10 wt. % of (meth) acrylic acid, based on the total weight of the monomers. The transparent heat resistive adhesive tape has a transparency of at least 30% over at least a portion of the wavelengths from 500 to 1600 nm and has a surface resistivity of less than about $10^{11}\Omega/sq$ or from about $10^7$ to about $10^{11}\Omega/sq$. for antistatic performance.

In still another embodiment, the present disclosure provides a method of using a transparent heat resistive adhesive tape including providing the transparent heat resistive adhesive tape on an electrical component; and inspecting the electrical component through the transparent heat resistive adhesive tape. The adhesive tape includes a transparent backing layer; an electrically conductive transparent layer disposed on the backing layer; a transparent acrylic adhesive layer disposed on the electrically conductive transparent layer, the acrylic adhesive layer containing a crosslinked mixture of monomers to impart heat resistance to the layer. The transparent heat resistive adhesive tape has a transparency of at least 30% over at least a portion of the wavelengths from 500 to 1600 nm and has a surface resistivity of less than about $10^{11}\Omega/sq$ or from about $10^7$ to about $10^{11}\Omega/sq$ for antistatic performance. In the embodiments of the present disclosure, surface resistivity may be measured on the exposed surface of the acrylic adhesive layer.

Repeated use of reference characters in the specification and drawings is intended to represent the same or analogous features or elements of the disclosure. The drawings may not be drawn to scale. As used herein, the word "between", as applied to numerical ranges, includes the endpoints of the ranges, unless otherwise specified. The recitation of numerical ranges by endpoints includes all numbers within that range (e.g. 1 to 5 includes 1, 1.5, 2, 2.75, 3, 3.80, 4, and 5) and any range within that range. Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

It should be understood that numerous other modifications and embodiments can be devised by those skilled in the art, which fall within the scope and spirit of the principles of the disclosure. All scientific and technical terms used herein have meanings commonly used in the art unless otherwise specified. The definitions provided herein are to facilitate understanding of certain terms used frequently herein and are not meant to limit the scope of the present disclosure. As used in this specification and the appended claims, the singular forms "a", "an", and "the" encompass embodiments having plural referents, unless the context clearly dictates otherwise. As used in this specification and the appended claims, the term "or" is generally employed in its sense including "and/or" unless the context clearly dictates otherwise.

DETAILED DESCRIPTION OF THE INVENTION

The present disclosure relates to adhesive tapes that may be used as a protective layer, e.g. for protecting an electronic device and/or component thereof, such as an image sensor module during an assembly process. The adhesive tapes of the present disclosure may be heat resistive, e.g. capable of performing at temperatures greater than 100° C., greater than 150° C., greater than 170° C. or even greater than 200° C. The adhesive tapes of the present disclosure may also provide antistatic properties, e.g. provide surface resistivities no greater than about $10^{11}$ Ω/sq, that can protect an electronic component from static charge build-up and/or foreign material that may be attracted to such a static charge. Exemplary features of the adhesive tapes of the present disclosure may include heat resistivity throughout the tape's layers, antistatic performance on the adhesive side of the tape and optical transparency over at least a portion of the visible region of the electromagnetic spectrum through the thickness of the adhesive tape.

In one embodiment, the transparent heat resistive adhesive tape of the present disclosure may be used as an image sensor protection tape. The transparent heat resistive adhesive tape includes a high temperature resistant polyimide backing layer, an electrically conductive transparent layer, and a transparent acrylic adhesive layer. The tape may include antistatic performance on the adhesive side of the tape and transparency through the thickness of the tape for visual inspection, e.g. visual inspection of the substrate to which the tape is attached, e.g. an image sensor.

Figure 1:
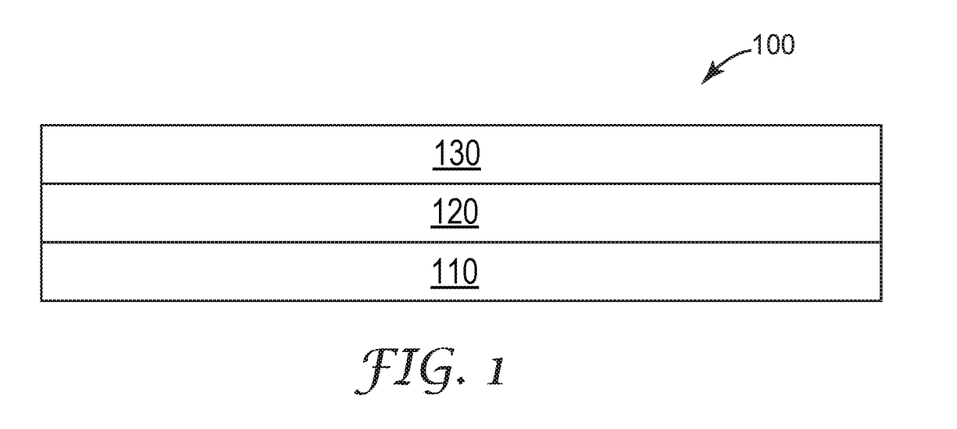
FIG. 1 is a schematic cross-sectional view of an exemplary transparent heat resistive adhesive tape showing the layers of the transparent heat resistive adhesive tape, according to one exemplary embodiment of the present disclosure.

FIG. 1 is a schematic cross-sectional view of an exemplary transparent heat resistive adhesive tape, according to one exemplary embodiment of the present disclosure. Transparent heat resistive adhesive tape 100 includes at least three layers: a transparent backing film layer 110, an electrically conductive transparent layer 120, and a transparent acrylic adhesive layer 130. Electrically conductive transparent layer 120 is disposed on at least a portion of a major surface of transparent backing film layer 110. Transparent acrylic adhesive layer 130 is disposed on at least a portion of electrically conductive transparent layer 120.

Transparent backing film layer 110 supports transparent acrylic adhesive layer 130. Transparent backing film layer 110 includes a first and second major surface. In some embodiments, the backing film layer may support the transparent acrylic adhesive layer over at least a portion of its first major, up to an including its entire first major surface. In some embodiments, the backing film layer may support the adhesive layer over at least a portion of its first major surface and over at least a portion of its second major, up to and including its entire first major surface and/or its entire second major surface. The material for the transparent backing film layer may be selected depending on the temperature needs. For example, a polyethylene terephthalate (PET) film can be selected as a backing film layer if the temperature encountered during use is less than about 170° C. When the use temperature is 170 to 200° C., at least one of polyetherimide, polyether sulfone, polyethylene naphthalate, and polyphenylene sulfide may be used as the backing layer. Further, if the use temperature is above about 200° C., the backing film layer may be at least one of polyetheretherketone, polyamideimide, and polyimide. Of course, any of these materials may be used for temperature below 200° C. Considering availability and chemical stability, polyimide or polyethylene naphthalate may be preferable. In some embodiments, the transparent backing film layer includes at least one of polyester, e.g. PET and PBT, polyamide, polyetherimide, polyether sulfone, polyethylene naphthalate, polyetheretherketone, polyamideimide, and polyimide.

Transparent backing film layer 110 may have a thickness of about 12.5, 15, 20, 30 or 40 microns or more or about 125, 110, 100, 90 or 80 microns or less. The transparent backing film layer 110 may also have a thickness ranging from about 12.5 microns to about 125 microns. In some embodiments the thickness may be from 15 to 110 microns, 20 to 100 microns, 30 to 90 microns, or 40 to 80 microns. The thickness of the transparent backing film layer may be selected base on the application.

Electrically conductive transparent layer 120 may be an electrically conductive polymer. Electrically conductive transparent layer 120 may be at least one of poly(3,4-ethylenedioxythiophen) polystyrene sulfonate (PEDOT/PSS) and a carbon nanotube film. The carbon nanotube film may be a single, i.e. a monolayer, of carbon nanotubes or multiple layers of carbon nanotubes, i.e. multiple monolayers, stacked on top of each other. If multiple layers are used, some embodiments may include at least 2, at least 4, at least 6, at least 8 or even more carbon nanotube monolayers. In some embodiments, the thickness of the electrically conductive transparent layer may be about 0.1, 0.3, 0.6, 0.9, or 1.2 microns or more or about 3, 2.7, 2.4, 2.1, or 1.8 microns or less. The thickness of the electrically conductive transparent layer may also have a range from about 0.1 micron to about 3 microns. In some embodiments, the thickness may be, for example, 0.3 to 2.7 microns, 0.6 to 2.4 microns, 0.9 to 2.1 microns, or 1.2 to 1.8 microns. The thickness of the electrically conductive transparent layer may be selected base on the application. The electrically conductive transparent layer may improve the electrical conductivity of the transparent heat resistive adhesive tape, e.g. improving its antistatic properties.

In some embodiments, the transparent acrylic adhesive layer 130 may be a transparent, heat resistive acrylic base polymer that can be polymerized via a free radical polymerization method or a living radical polymerization method using monomers. Monomers containing ether-groups and/or hydroxy-groups are suitable for imparting anti-static property. Monomer formulations for this use may include at least one of alkyl (meth)acrylate; ether group containing (meth) acrylate, such as ethoxy diethyleneglycol acrylate and methoxy nonaethyleneglycol acrylate; (meth)acrylic acid, glycidyl methacrylate; and hydroxy functional group containing (meth)acrylate, such as 2-hydroxy ethyl acrylate, 4-hydroxy butyl acrylate. Formulations containing one or more of the above monomers may prevent undesirable adhesion build up after a thermal process. Transparent acrylic adhesive layer 130 may also include at least one crosslinking monomer and/or oligomer.

In some embodiments, the transparent acrylic adhesive layer 130 may be a polymer obtained by polymerizing a monomer mixture containing an alkyl (meth) acrylate having C4 to C15 alkyl group, glycidyl (meth) acrylate, and (meth) acrylic acid. These polymerized acrylic monomers may be crosslinked by reacting the glycidyl (epoxy group) of glycidyl (meth) acrylate with the carboxyl group of (meth) acrylic acid. In terms of weight percentage of the total weigh of the monomers, alkyl (meth) acrylate may be from 77 to 97 wt. %, glycidyl (meth) acrylate 0.1 to 13 wt. %, and (meth) acrylic acid 1 to 10 wt. %. In some embodiments, when glycidyl (meth) acrylate is less than 2% by weight or when (meth) acrylic acid is less than 1% by weight, heat resistance of the adhesive may degrade such that some of the adhesive may remain on the adherend during heat treatment. In some embodiments, when glycidyl (meth) acrylate exceeds 13% by weight or (meth) acrylic acid exceeds 10% by weight, adhesion to an adherend may degrade such that peeling may occur during use. For a balance of good heat resistance to prevent adhesive residues on substrate surfaces and good adhesion to a substrate, glycidyl (meth) acrylate may be used from 0.1 to 10% by weight based on the total weight of the monomers, 2.0 to 10% by weight based on the total weight of the monomers or from 1 to 5% by weight based on the total weight of monomers.

The transparent acrylic adhesive layer 130 may further include an ionic liquid. In some embodiments, the ionic liquid is miscible with the monomer mixture that forms the transparent acrylic adhesive layer. Miscibility of the ionic liquid improves the transparency of the transparent acrylic adhesive layer. Addition of the ionic liquid to the monomer mixture that forms the final transparent acrylic adhesive may also further improve the adhesion performance and the stability of the tape. In some embodiments, the ionic liquid may be immiscible or partially miscible with the monomer mixture that forms the transparent acrylic adhesive layer. In these embodiments, the ionic liquid may further improve the electrical conductivity of the transparent acrylic adhesive layer and subsequently the electrical conductivity of the transparent acrylic adhesive tape, e.g. improving its antistatic properties. The ionic liquid may include the salt of hydroxy alkyl containing ammonium cation ($N+R_3R$—OH) and fluoro-imide anion bis(trifluoromethyl sulfonyl) imide. One such ionic liquid is available under the trade designation 3M IONIC LIQUID ANTISTAT FC5000i, from the 3M Company, St. Paul, MN.

In some embodiments, transparent acrylic adhesive layer 130 may have a thickness of about 3 microns to about 100 microns. In some embodiments, the thickness of the transparent acrylic adhesive layer may be from 5 to 90 microns, 10 to 90 microns, 20 to 90 micron, or 20 to 80 microns. The thickness of the transparent acrylic adhesive layer may be selected base on the application.

The surface resistivity of the transparent acrylic adhesive tapes of the present disclosure may be less than $1\times10^{11}\Omega$/sq or between $1\times10^7$ and $1\times10^{11}\Omega$/sq, as this range may typically define the range of resistivity required for the adhesive tape to exhibit antistatic behavior. The surface resistivity is typically measured on the adhesive side/surface of the transparent acrylic adhesive tapes. The surface resistivity of a tape construction without the electrically conductive transparent layer 120 is over $1\times10^{11}\Omega$/sq., which does not satisfy the antistatic property required, for example, for protecting electronic elements such as image sensors. In some embodiments, the surface resistivity of the transparent acrylic adhesive tape may be from $1\times10^7\Omega$/sq and $1\times10^{11}\Omega$/sq, $2\times10^7$ to $1\times10^{11}\Omega$/sq, $3\times10^7$ to $1\times10^{11}\Omega$/sq, $4\times10^7$ to $1\times10^{11}\Omega$/sq, $5\times10^7$ to $1\times10^{11}\Omega$/sq, $6\times10^7$ to $1\times10^{11}\Omega$/sq, $7\times10^7$ to $1\times10^{11}\Omega$/sq, or $8\times10^7$ to $1\times10^{11}\Omega$/sq. In some embodiments, the surface resistivity may range, for example, from $8.9\times10^7\Omega$/sq to $2.7\times10^{11}\Omega$/sq, $3.7\times10^8\Omega$/sq to $3.7\times10^9\Omega$/sq, or $4.0\times10^9\Omega$/sq to $1\times10^{11}\Omega$/sq. In some embodiments, the surface resistivity of the transparent acrylic adhesive tape may be less than $1\times10^{11}\Omega$/sq, less than $1\times10^{10}\Omega$/sq, less than $1\times10^9\Omega$/sq, less than $1\times10^8\Omega$/sq or even less than less than $1\times10^7\Omega$/sq.

Additionally, an optional primer layer (not shown in FIG. 1) may be disposed between electrically conductive transparent layer 120 and transparent acrylic adhesive layer 130. The primer is selected to improve the adhesion between the two layers.

The transparent heat resistive adhesive tapes (which include layers 110, 120 and 130) of the present disclosure may have a transparency of at least 30% over at least a portion of wavelengths from 500 to 1600 nm, from 500 to 1600 nm, from 600 to 1600 nm, from 500 to 1200 nm, from 600 to 1200 nm, from 500 to 1000 nm, from 600 to 1000 nm, from 500 to 900 nm, from 600 to 900 nm, from 500 to 800 nm, from 600 to 800 nm, from 500 to 700 nm or from 600 to 700 nm. In some embodiments, the transparent heat resistive adhesive tape may have a transparency of greater than 30%, greater than 40%, greater than 50%, greater than 60%, greater than 70% or even greater than 80% over at least a portion of the wavelengths from 500 nm to 700 nm. In some embodiments, the transparent heat resistive adhesive tape may have a transparency of greater than 80% over at least a portion of the wavelengths from 700 nm to 1600 nm, from 700 nm to 1400 nm, from 700 nm to 1200 nm from 900 nm to 1600 nm from 900 nm to 1400 nm or from 900 nm to 1200 nm. The term transparency may be defined as having light transmission of at least about 30% to about 90%, where 100% is complete transmittance of light in the range of 500 to 1600 nm without attenuation.

This combination of the layers 120 and 130 with the backing film layer 110 achieve the needed heat resistivity, surface resistivity (e.g. antistatic property) on the adhesive side, and transparency of the tape.

The present invention will be described more in detail with reference to working examples and comparative examples.

EXAMPLES

Transparent Backing Film Layer and Electrically Conductive Transparent Layer Preparation:

Backing 1: conductive polymer solution: PEDOT/PSS (available under the trade designation AS-Q01SI, from Shin-Etsu Polymer, Tokyo, Japan) was diluted with DI water and isopropyl alcohol, based on weight as follows: AS-Q01SI/ $H_2O$/IPA 1/2/7. The diluted solution was then coated on a conventional polyimide film of 25 micron thickness (for example available under the trade designation KAPTON from DuPont, Wilmington, DE) using a No. 5 wire bar. The coating was applied at about 10 $cm^3/m^2$. The coated web was dried in an oven at 120° C. for 1 min, forming an electrically conductive transparent layer on the polyimide film.

Backing 2: single walled carbon nanotube solution (available under the trade designation TUBALL COAT_E IPA PAD from OCSiAl, Leudelange, Luxembourg) was coated on conventional polyimide film of 25 micron thickness using a No. 5 wire bar. The coating was applied at about 10 cm$^3$/m$^2$. The coated web was dried in an oven at 120° C. for 1 min, forming an electrically conductive transparent layer on the polyimide film.

Backing 3: a conventional polyimide film of 25 micron thickness was used as received.

Backing 4: primer solution: an aminoethylated acrylic polymer (available under the trade designation POLYMENT NK350 from Nippon Shokubai, Osaka, Japan) was diluted with toluene and isopropyl alcohol, based on weight as follows: POLYMENT NK350/Toluene/IPA 28.6/50.0/21.4. The diluted solution was coated on a conventional polyethylene naphthalate film of 25 micron thickness using a No. 5 wire bar and dried in an oven at 120° C. for 1 min.

Then conductive polymer solution, PEDOT/PSS (available under the trade designation AS-Q01SI from Shin-Etsu Polymer), was diluted with DI water and isopropyl alcohol, based on weight as follows: AS-Q01SI/H$_2$O/IPA 1/2/7. This solution was then coated on the primer layer of the primer coated polyethylene naphthalate film using a No. 5 wire bar. The coating was applied at about 10 cm$^3$/m$^2$. The coated web was dried in an oven at 120° C. for 1 min.

Backing 5: a conventional polyethylene naphthalate film of 25 micron thickness was used as received.

Adhesive Polymer Preparation

Acrylic Adhesive 1: 2EHA/AA/GMA=88.9/3.7/7.4

2-ethyl hexyl acrylate (88.9 parts by wt.) (2EHA, available for example from Sigma-Aldrich Inc., St. Louis, MO), acrylic acid (3.7 parts by wt.) (AA, available for example from Sigma-Aldrich Inc.), glycidyl methacrylate (7.4 parts by wt.) (GMA, available for example from Sigma-Aldrich Inc.) and ethyl acetate (100 parts by wt.) (available for example from Sigma-Aldrich Inc.) were dissolved in a pressure bottle. After addition of 0.2 parts by wt. 2,2'-azobis (2,4-dimethylvaleronitorile) as initiator (available for example from TCI America, Portland, OR), nitrogen gas was bubbled for 10 min. through an inert gas introduction tube, and the pressure bottle was sealed immediately. The polymerization was carried out in a water bath for 20 hours at 50° C. Inherent viscosity in ethyl acetate at 30° C. was measured using a concentration of 0.2 g/dl. The number was 1.01 dl/g.

Acrylic Adhesive 2: 2EHA/AA/GMA=89.5/9/1.5

2-ethyl hexyl acrylate (89.5 parts by wt.), acrylic acid (9 parts by wt.), glycidyl methacrylate (1.5 parts by wt.) and ethyl acetate (138.1 parts by wt.) were dissolved in a pressure bottle. After addition of 0.2 parts by wt. 2,2'-azobis (2,4-dimethylvaleronitorile) as initiator, nitrogen gas was bubbled for 10 min. through an inert gas introduction tube, and the pressure bottle was sealed immediately. The polymerization was carried out in a water bath for 20 hours at 50° C. Inherent viscosity in ethyl acetate at 30° C. was measured using a concentration of 0.2 g/dl. The number was 1.15 dl/g.

Acrylic Adhesive 3: 2EHA/2HEA=90/10

2-ethyl hexyl acrylate (90 parts by wt.), 2-hydroxy ethyl acrylate (10 parts by wt.) (2HEA, available for example from Sigma-Aldrich Inc.) and ethyl acetate (150 parts by wt.) were dissolved in a pressure bottle. After addition of 0.2 parts by wt. 2,2'-azobis (2,4-dimethylvaleronitorile) as initiator, nitrogen gas was bubbled for 10 min. through an inert gas introduction tube, and the pressure bottle was sealed immediately. The polymerization was carried out in a water bath for 20 hours at 50° C. The inherent viscosity in ethyl acetate at 30° C. was measured using a concentration of 0.2 g/dl. The number was 0.96 dl/g.

Adhesive Coating Solution Preparation

Acrylic adhesive 1 was diluted with toluene to be 30 wt. % solids. An ionic fluid, 2-hydroxyethyl dimethyl octyl ammonium Bis(trifluoromethanesulfonyl)imide salt (available under the trade designation FC-5000i, from 3M Company, St. Paul, MN), was added in the amounts shown in Table 1.

TABLE 1

| | Adhesive Solution # | | | | | | | |
|---|---|---|---|---|---|---|---|---|
| | 1 | 2 | 3 | 4 | 5 | 6 | 7 | 8 |
| FC5000i* | 0 | 0.1 | 0.2 | 0.5 | 1.0 | 1.5 | 3.0 | 6.0 |

*Weight of FC5000i based on 100 parts by wt. Acrylic adhesive 1.

Acrylic adhesive 2 was diluted with toluene to be 30 wt. % solids. Ionic fluid FC-5000i and 0.15 parts by wt. of 1,3-bis(N,N-diglycidylaminomethyl)cyclohexane, a crosslinker, (available under the trade designation TETRAD-C, from Mitsubishi Gas Chemical, Tokyo, Japan) were added in the amounts shown in Table 2.

TABLE 2

| Adhesive Solution # | 9 | 10 |
|---|---|---|
| FC5000i* | 0 | 1.0 |
| Tetrad-C* | 0.15 | 0.15 |

*Weight of FC5000i and Tetrad-C based on 100 parts by wt. Acrylic adhesive 2.

Acrylic adhesive 3 was diluted with toluene to be 30 wt. % solids. Ionic fluid FC-5000i and an aromatic polyisocyanate based on toluene diisocyanate (available under the trade designation DESMODUR L75 from Covestro, Leverkusen, Germany) were added in the amounts shown in Table 3.

TABLE 3

| Adhesive Solution # | 11 | 12 |
|---|---|---|
| FC5000i* | 1.0 | 2.0 |
| Desmodur L75* | 0.4 | 0.4 |

*Weight of FC5000i and Desmodur L75 based on 100 parts by wt. Acrylic adhesive 3.

Adhesive Tape Preparation

Example 1 was prepared as follows: Adhesive solution 1 was coated on backing 1 with knife coater and dried in an oven at 100° C. for 3 min. The dried adhesive layer thickness was measured to be 22 microns. The adhesive surface was covered with a siliconized PET liner. Examples 2 to 4 and Comparative Examples 1 to 4 were prepared in a similar manner as Example 1, except a different Adhesive solution was used, as shown in Table 4. Other sample adhesive tapes with varying thickness with different combinations were prepared as shown in Tables 4 to 8 below.

TABLE 4

| Ex. # | Com. Ex. 1 | Ex. 1 | Ex. 2 | Ex. 3 | Ex. 4 | Ex. 5 | Ex. 6 | Ex. 7 |
|---|---|---|---|---|---|---|---|---|
| Backing # | 1 | | | | | | | |
| Adh. Sol. # | 1 | 2 | 3 | 4 | 5 | 6 | 7 | 8 |
| Adh. Thickness | 22 μm | | | | | | | |

TABLE 5

| Ex. # | Com. Ex. 2 | Ex. 8 | Ex. 9 | Com. Ex. 3 | Com. Ex. 4 |
|---|---|---|---|---|---|
| Backing # | 2 | | | 3 | |
| Adh. Sol. # | 1 | 6 | 7 | 6 | 7 |
| Adh. Thickness | 22 μm | | | | |

TABLE 6

| Ex. # | Ex. 10 | Ex. 5 | Ex. 11 | Ex. 12 |
|---|---|---|---|---|
| Backing # | 1 | | | |
| Adh. Sol. # | 6 | | | |
| Adh. Thickness | 3 μm | 22 μm | 40 μm | 80 μm |

TABLE 7

| Ex. # | Com. Ex. 5 | Ex. 13 | Ex. 14 | Com. Ex. 6 |
|---|---|---|---|---|
| Backing # | 3 | 1 | 4 | 5 |
| Adh. Sol. # | 9 | | 10 | |
| Adh. Thickness | 22 μm | | | |

TABLE 8

| Ex. # | Ex. 15 | Ex. 16 | Com. Ex. 7 | Com. Ex. 8 |
|---|---|---|---|---|
| Backing # | 1 | | Backing 3 | |
| Adh. Sol. # | 11 | 12 | 11 | 12 |
| Adh. Thickness | 22 μm | | | |

180 Degree Peel Adhesion Test on Glass (a) Tape sample strips were cut to 10 mm widths.

(b) A glass substrate was wiped with methyl ethyl ketone (MEK).

(c) Tape sample strips were applied to the glass substrate and aa 2.0 Kg rubber roller was applied to the tape strips to bond them onto cleaned glass substrates.

(d) Aging of the tapes on the glass substrates was carried out in three cases:

1. (23° C./30 min)—aging for 30 min at 23° C., 2. (210° C./60 min)—aging for 60 min at 210° C. and cooled to 23° C., and 3. (260° C./10 min)—aging for 10 min at 260° C. and cooled to 23° C.

(e) After each aging condition, tapes were peeled at the peel angle of 180 degrees in a room at 23° C. at a rate of 300 mm/min. The equipment used was an Autograph, AGS-X, from Shimadzu Co., Kyoto, Japan. Peel adhesion force (N/cm) and adhesive residue on the substrate was observed by visual observation. Results are shown in Tables 9 to 12 as follows.

TABLE 9

| Ex. # | Com. Ex. 1 | Ex. 1 | Ex. 2 | Ex. 3 | Ex. 4 | Ex. 5 | Ex. 6 | Ex. 7 |
|---|---|---|---|---|---|---|---|---|
| Backing # | 1 | | | | | | | |
| Adh. Solution # | 1 | 2 | 3 | 4 | 5 | 6 | 7 | 8 |
| 23° C./30 min (N/cm) | 1.10 | 1.09 | 1.20 | 1.17 | 1.23 | 1.10 | 0.60 | 1.00 |
| 210° C./1 H (N/cm) | 0.49 | 0.42 | 0.45 | 0.47 | 0.49 | 0.46 | 0.21 | 0.09 |
| 260° C./10 min (N/cm) | 0.42 | 0.44 | 0.46 | 0.47 | 0.52 | 0.49 | 0.26 | 0.05 |

TABLE 10

| Ex. # | Com. Ex. 2 | Ex. 8 | Ex. 9 | Com. Ex. 3 | Com. Ex. 4 |
|---|---|---|---|---|---|
| Backing # | 2 | | | 3 | |
| Adh. Solution # | 1 | 6 | 7 | 6 | 7 |
| 23° C./30 min | — | — | — | — | — |
| 210° C./1 H | — | — | — | — | — |
| 260° C./10 min | — | — | — | — | — |

TABLE 11

| Ex. # | Ex. 10 | Ex. 5 | Ex. 11 | Ex. 12 |
|---|---|---|---|---|
| Backing # | 1 | | | |
| Adh. Sol. # | 6 | | | |
| 23° C./30 min (N/cm) | 0.49 | 1.10 | 1.27 | 1.25 |
| 210° C./1 H (N/cm) | 0.3 | 0.46 | 0.46 | 0.22 |
| 260° C./10 min (N/cm) | 0.31 | 0.49 | 0.45 | 0.25 |

TABLE 12

| | Com. Ex. 5 | Ex. 13 | Ex. 14 | Com. Ex. 6 | Ex. 15 | Ex. 16 | Com. Ex. 7 | Com. Ex. 8 |
|---|---|---|---|---|---|---|---|---|
| Backing # | 3 | 1 | 4 | 5 | 1 | | 3 | |
| Adh. Sol. # | 9 | | 10 | | 11 | 12 | 11 | 12 |
| 23° C./30 min (N/cm) | 2.43 | 1.75 | 3.35 | — | 0.71 | 0.77 | 0.73 | 0.73 |
| 210° C./1 H (N/cm) | 1.43 | 1.26 | 2.73 | — | 1.16 | 1.06 | 0.93 | 0.89 |
| 260° C./10 min (N/cm) | 1.30 | 1.30 | #2-bond | — | 1.18 | 1.07 | 0.93 | 0.91 |

Debonding of the tapes from the glass substrates was clean (no adhesive residue on the substrate surface) for all except Example 7, where some residue was observed and Example 14 where bonding failure occurred.

Surface Resistivity Measurement

Tables 13 to 17 show the surface resistivity measurements of various examples. The equipment used to measure the surface resistivity was Hiresta-UX MCP-HT800 with URS probe (MCP-HTP14), (Nittoseiko Analytech, Kanagawa, Japan).

TABLE 13

| | Com. Ex. 1 | Ex. 1 | Ex. 2 | Ex. 3 | Ex. 4 | Ex. 5 | Ex. 6 | Ex. 7 |
|---|---|---|---|---|---|---|---|---|
| Backing # | | | | | 1 | | | |
| Adh. Sol. # | 1 | 2 | 3 | 4 | 5 | 6 | 7 | 8 |
| S.R. at 100 V | >1E+13 | 4.0E+09 | 3.1E+09 | 1.6E+09 | 6.1E+08 | 3.7E+08 | 2.7E+08 | 3.6E+08 |

TABLE 14

| | Com. Ex. 2 | Ex. 8 | Ex. 9 | Com. Ex. 3 | Com. Ex. 4 |
|---|---|---|---|---|---|
| Backing # | | 2 | | 3 | |
| Adh. Sol. # | 1 | 6 | 7 | 6 | 7 |
| S.R. at 100 V | 4.9E+12 | 3.7E+09 | 2.9E+08 | 8.6E+11 | 2.7E+11 |

TABLE 15

| Ex. # | Ex. 10 | Ex. 5 | Ex. 11 | Ex. 12 |
|---|---|---|---|---|
| Backing # | | 1 | | |
| Adh. Sol. # | | 6 | | |
| S.R. at 100 V | 3.5E+08 | 3.7E+08 | 7.9E+08 | 1.3E+09 |

TABLE 16

| Ex. # | Com. Ex. 5 | Ex. 13 | Ex. 14 | Com. Ex. 6 |
|---|---|---|---|---|
| Backing # | 3 | 1 | 4 | 5 |
| Adh. Sol. # | 9 | | 10 | |
| S.R. at 100 V | — | 1.7E+09 | 3.3E+10 | >1E+13 |

TABLE 17

| | Ex. # | | | | | |
|---|---|---|---|---|---|---|
| | Ex. 15 | Ex. 16 | Com. Ex. 7 | Com. Ex. 8 | | |
| Backing # | 1 | | 3 | | 3 | 5 |
| Adh. Sol. # | 11 | 12 | 11 | 12 | — | — |
| S.R. at 100 V | 2.4E+08 | 8.9E+07 | 2.0E+11 | 6.0E+10 | >1E+13 | >1E+13 |

Transparency Measurement of Tape Samples

Tables 18 to 22 below show exemplary transmittance from 450 nm to 700 nm. Table 23 shows the transmittance of the backing film layer for comparison. FIGS. 2A and 2B to FIG. 6 show transmittance vs. wavelength plot from about 350 nm to about 1600 nm. The equipment used to measure the transparency of the samples was a UV/vis spectrometer available under the trade designation U-3310 from Hitachi High-Tech., Tokyo, Japan.

TABLE 18

| | Ex. # | | | | | | | |
|---|---|---|---|---|---|---|---|---|
| | Com. Ex. 1 | Ex. 1 | Ex. 2 | Ex. 3 | Ex. 4 | Ex. 5 | Ex. 6 | Ex. 7 |
| Backing # | | | | 1 | | | | |
| Adh. Sol. # | 1 | 2 | 3 | 4 | 5 | 6 | 7 | 8 |
| Transmittance | | | | | | | | |
| at 450 nm | 1 | 1 | 1 | 1 | 0.9 | 1.2 | 1 | 1.1 |
| at 500 nm | 35.7 | 34.6 | 35.5 | 34.8 | 34.6 | 36.3 | 35.6 | 35.2 |
| at 600 nm | 78.5 | 77.4 | 77.7 | 77.4 | 77.5 | 77.8 | 78.5 | 77.3 |
| at 700 nm | 84.4 | 83.7 | 83.8 | 83.7 | 83.7 | 83.7 | 84.3 | 83.5 |

TABLE 19

| | Ex. # | | | | |
|---|---|---|---|---|---|
| | Com. Ex. 2 | Ex. 8 | Ex. 9 | Com. Ex. 3 | Com. Ex. 4 |
| Backing # | Com. Ex. 2 | Ex. 3 | Ex. 4 | Com. Ex. 3 | Com. Ex. 4 |
| Adh. Sol. # | | | | | |
| Transmittance | 2 | | | 3 | |
| at 450 nm | 0.9 | 1 | 1 | 1 | 1 |
| at 500 nm | 34 | 34.5 | 34.8 | 35 | 35.3 |
| at 600 nm | 77 | 77.2 | 77.6 | 78.3 | 78.3 |
| at 700 nm | 83.2 | 83.4 | 83.5 | 84.4 | 84.5 |

TABLE 20

| | Ex. # | | | |
|---|---|---|---|---|
| | Ex. 10 | Ex. 5 | Ex. 11 | Ex. 12 |
| Backing # | | 1 | | |
| Adh. Sol. # | | 6 | | |
| Transmittance | | | | |
| at 450 nm | 0.9 | 1.2 | 1 | 1 |
| at 500 nm | 34.3 | 36.3 | 35.2 | 35.7 |
| at 600 nm | 77.6 | 77.8 | 77.4 | 77.6 |
| at 700 nm | 83 | 83.7 | 83.6 | 83.7 |

TABLE 21

| | Ex. # | |
|---|---|---|
| | Ex. 13 | Ex. 14 |
| Backing # | 1 | 4 |
| Adh. Sol. # | 10 | |
| Transmittance | | |
| at 450 nm | 1.1 | 83 |
| at 500 nm | 35.4 | 83.8 |
| at 600 nm | 77.5 | 85.3 |
| at 700 nm | 83.5 | 85.9 |

TABLE 22

| | Ex. # | |
|---|---|---|
| | Ex. 15 | Ex. 16 |
| Backing # | 1 | |
| Adh. Sol. | | |
| Transmittance | 11 | 12 |
| at 450 nm | 1 | 1 |
| at 500 nm | 33.2 | 33.7 |
| at 600 nm | 76.1 | 76.9 |
| at 700 nm | 82.9 | 83.3 |

TABLE 23

| | Backing # | |
|---|---|---|
| Transmittance | 3 | 5 |
| at 450 nm | 0.9 | 88.5 |
| at 500 nm | 32.2 | 86.1 |
| at 600 nm | 74.3 | 88.2 |
| at 700 nm | 81.3 | 90.7 |

Figure 2A:
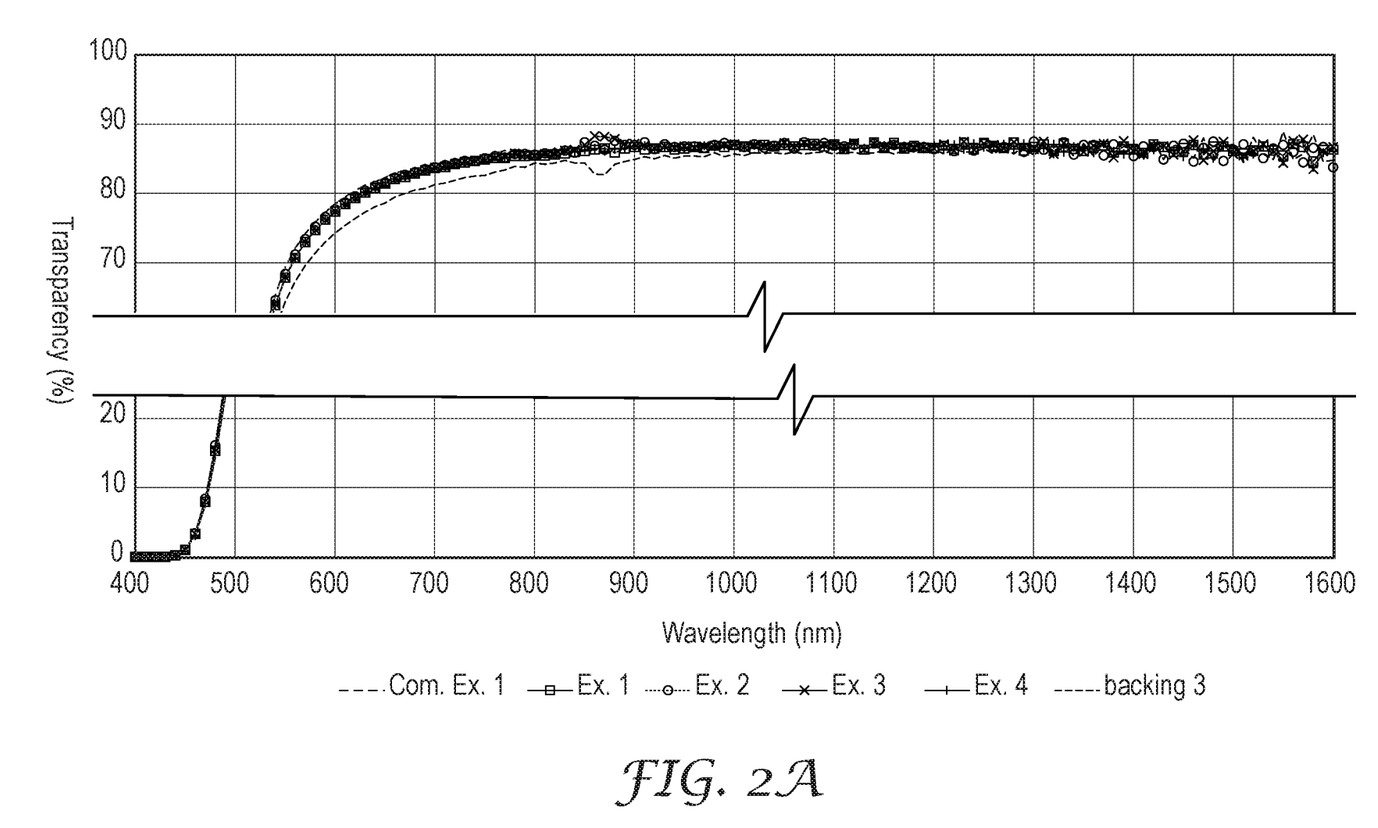
FIGS. 2A and 2B show transparency vs. wavelength plots of (i) exemplary transparent heat resistive adhesive tapes having varying ionic fluid concentrations, according to the present disclosure, (ii) a Backing thereof and (iii) a comparative example.
Figure 2B:
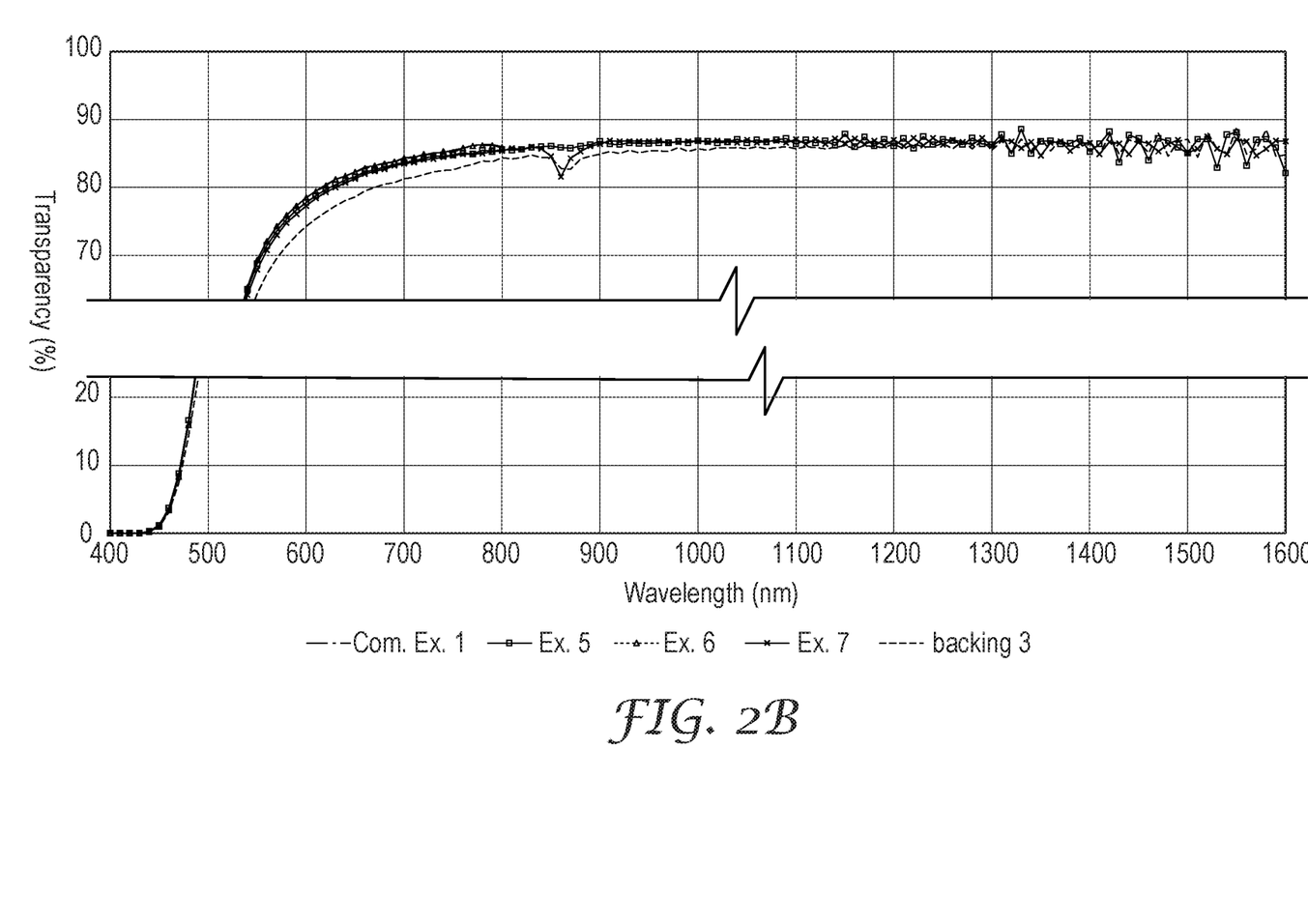

FIGS. 2A and 2B to 6 show percent transparency versus wavelength from about 350 nm to about 1600 nm. FIGS. 2A and 2B compare sample tapes, Examples 1 to 7, with varying concentration of ionic fluid, with Backing 3, which is a polyimide backing film. Polyimide film by itself is also transparent. Comparative Example 1 differing from Examples 1-7 by lacking the ionic fluid is also compared. Backing 3 is the lowest line in the graph against Examples 1-7, which means that the combination layers of Examples 1 to 7 confer slightly better transparency than Backing 3. Also, from FIGS. 2A and 2B, it is apparent that varying the amount of ionic fluid does not affect the transparency profile for the range of wavelengths measured.

Figure 3:
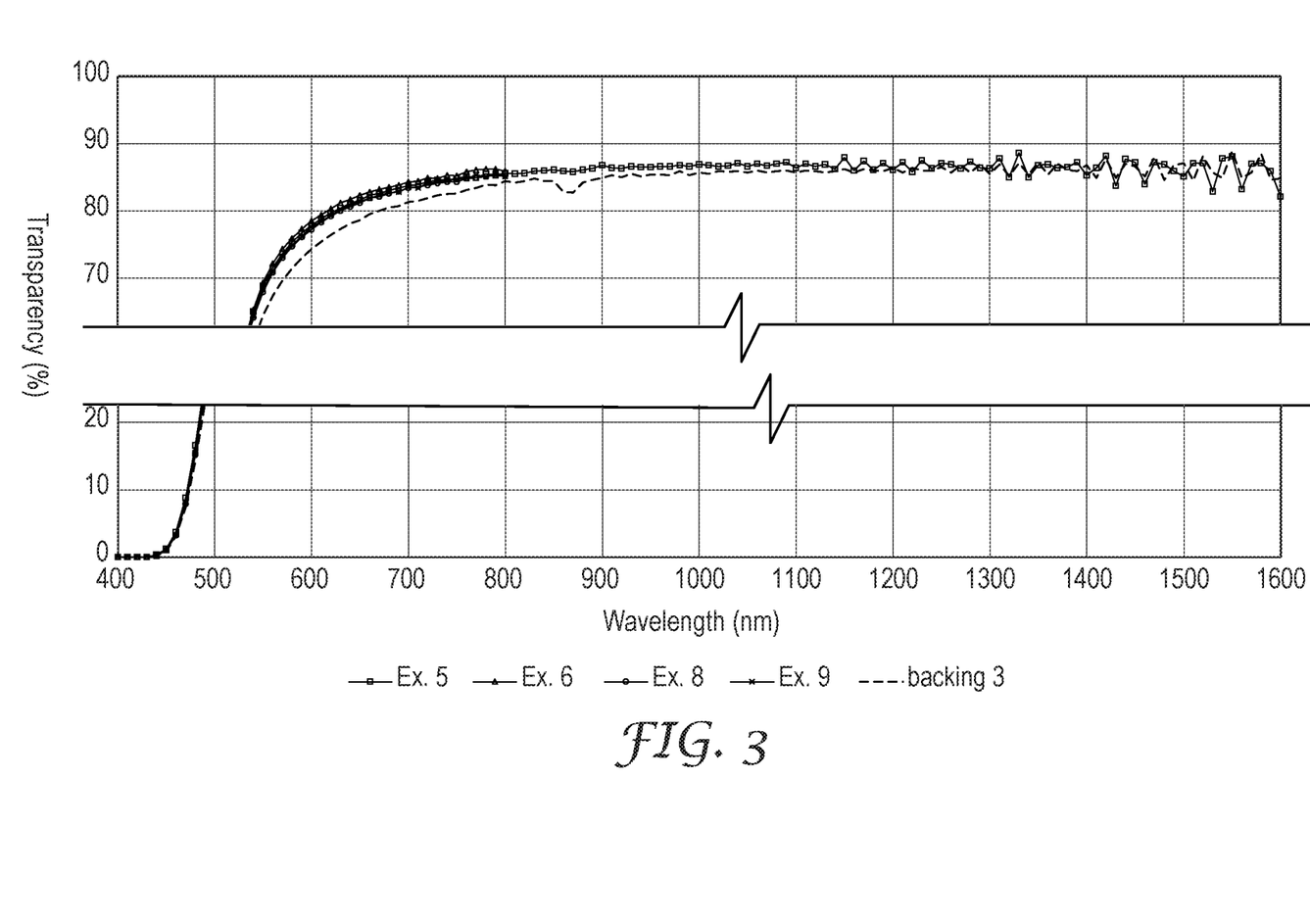
FIG. 3 shows transparency vs. wavelength plots of (i) exemplary transparent heat resistive adhesive tapes having different transparent backing film layers/electrically conductive transparent layers, according to the present disclosure, and (ii) a Backing thereof.

FIG. 3 shows show percent transparency versus wavelength of Examples 5, 6, 8, and 9 against Backing 3. Examples 5 and 6 have Backing 1 (PEDOT/PSS) and Examples 8 and 9 have Backing 2 (Carbon Nanotube). In both instances, the examples not only maintain good transparency but also have better transparency profiles than Backing 3, which is the lowest line in the graph.

Figure 4:
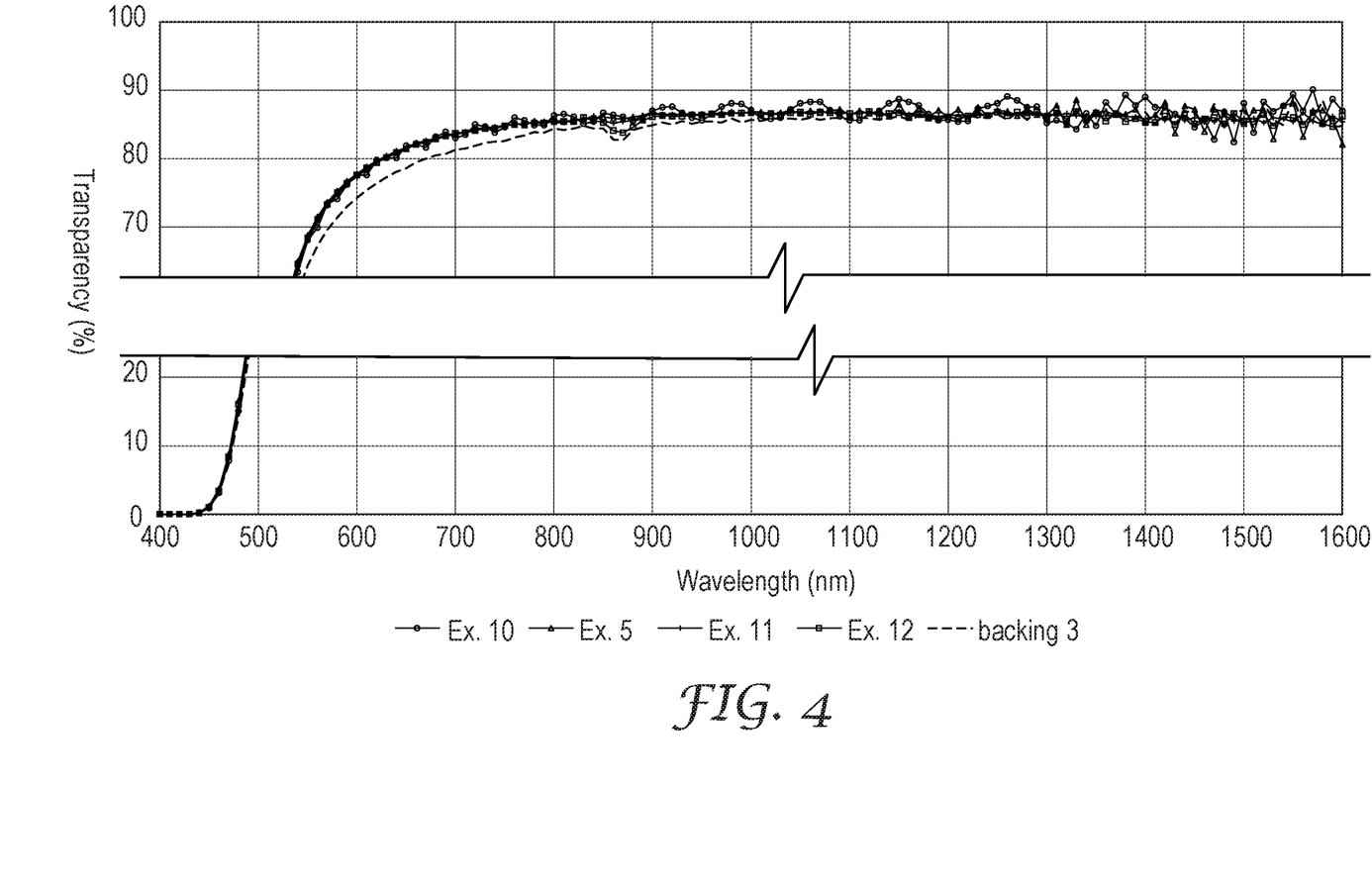
FIG. 4 shows transparency vs. wavelength plots of (i) exemplary transparent heat resistive adhesive tapes having varying adhesive thickness, according to the present disclosure, and (ii) a Backing thereof.

FIG. 4 shows show percent transparency versus wavelength of tapes with varying adhesive layer thickness. Examples 10, 5, 11, 12, have the adhesive layer thickness of 3, 22, 40, and 80 m, respectively while keeping other parameters the same. Again, the examples are all superior to a bare polyimide backing film in terms of transparency.

Figure 5:
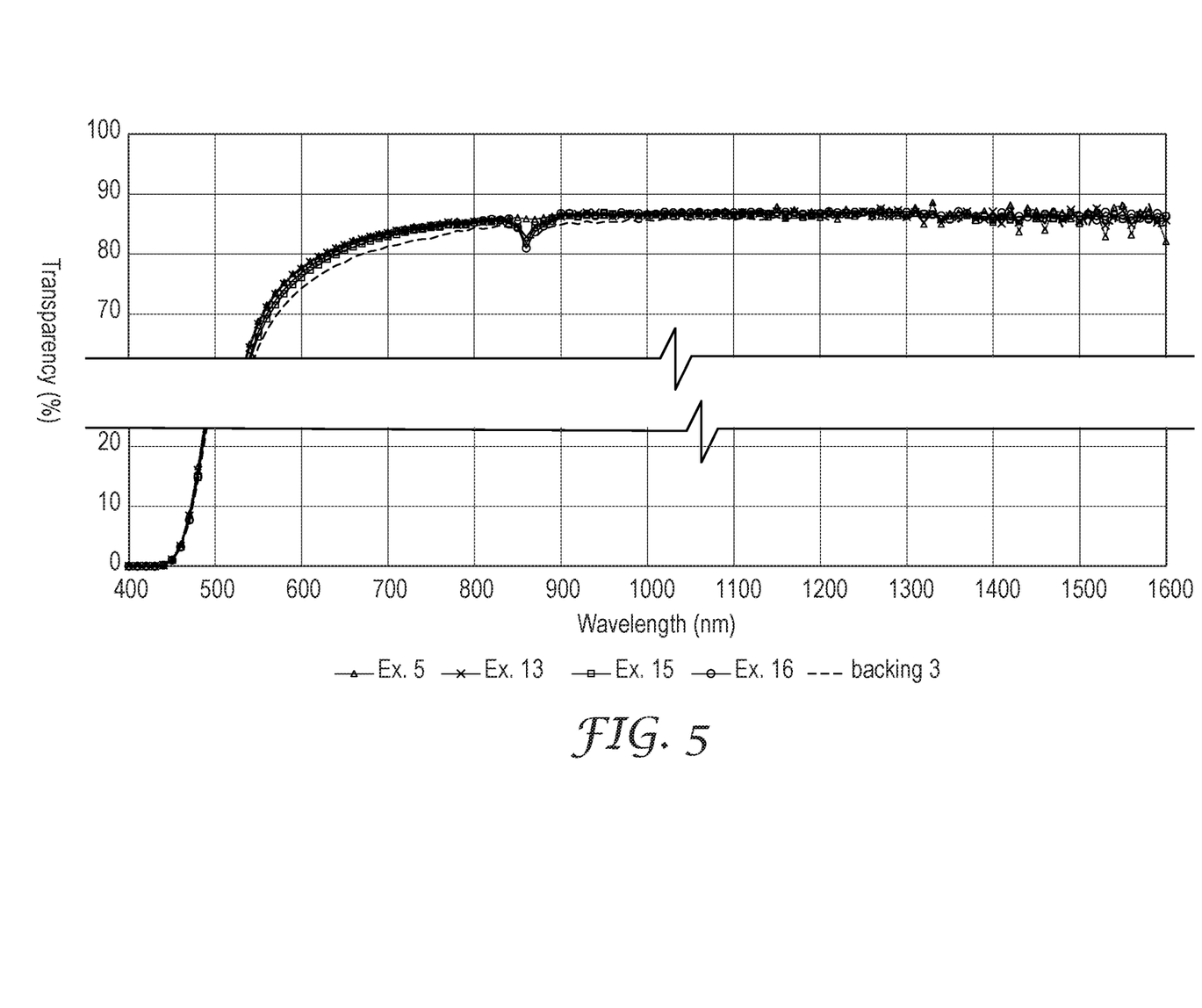
FIG. 5 shows transparency vs. wavelength plots of (i) exemplary transparent heat resistive adhesive tapes having different adhesive types, according to the present disclosure, and (ii) a Backing thereof.

FIG. 5 shows show percent transparency versus wavelength of different adhesive types. Examples 5, 13, 15, and 16 have Adhesive Solution 6, Adhesive Solution 10, Adhesive Solution 11, and Adhesive Solution 12, respectively. Again, transparency profiles of the examples are all relatively the same over the wavelength measured and are superior to that of Backing 3.

Figure 6:
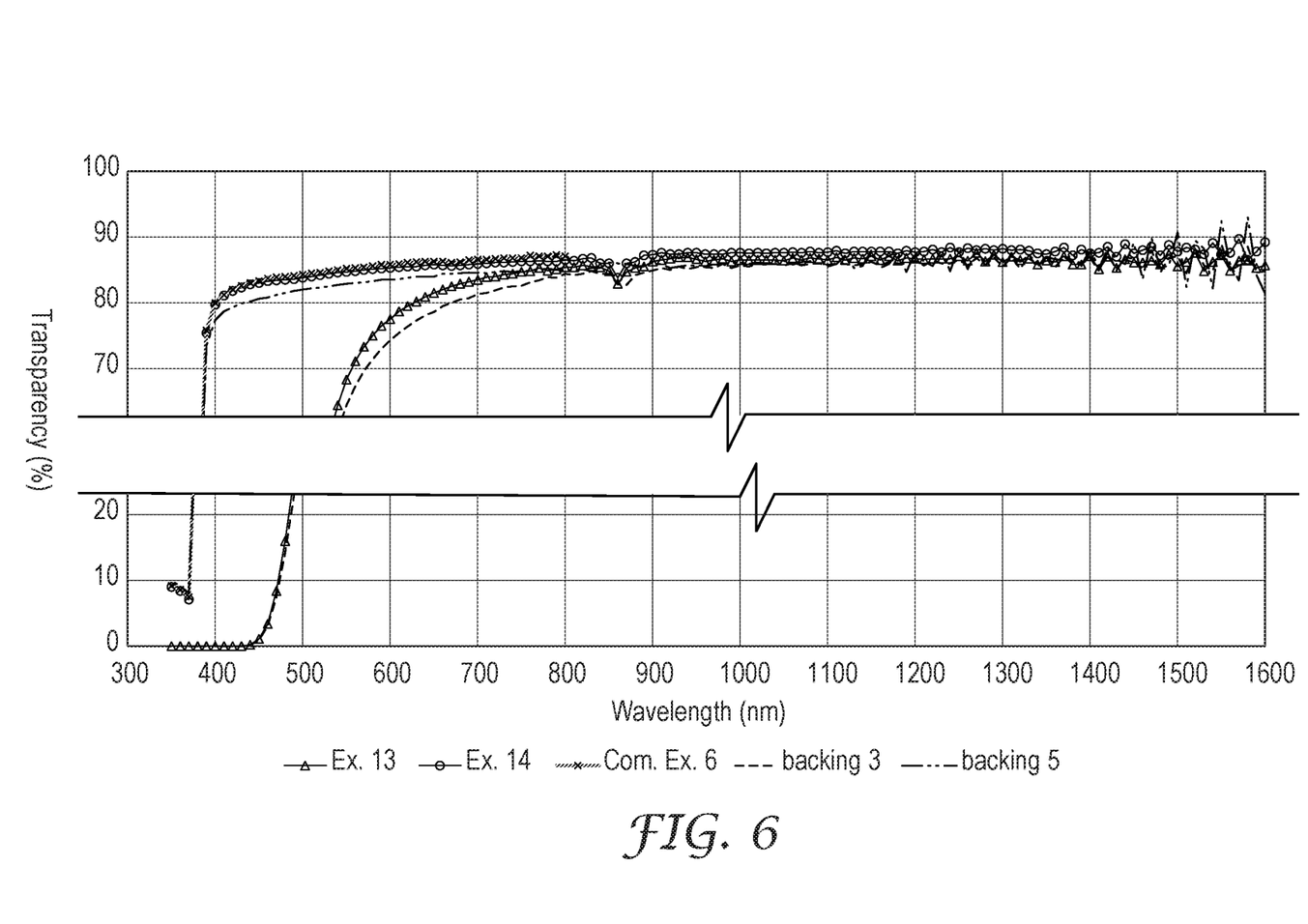
FIG. 6 shows transparency vs. wavelength plots of (i) exemplary transparent heat resistive adhesive tapes having different transparent backing film layers/electrically conductive transparent layers, according to the present disclosure, (ii) Backings thereof and (iii) a comparative example.

FIG. 6 shows show percent transparency versus wavelength of different transparent backing film layers/electrically conductive transparent layers. Examples 13 and 14 have Backing 1 and Backing 4, respectively. Comparative Example 6 has Backing 5. Example 13 and Backing 3 have the same polyimide backing film. Example 14 and Comparative Example 6 have a polyethylene naphthalate transparent backing film layer as a component. The transparency plots are different based on different backings used and show that non-polyimide films may be used.

What is claimed is:

1. A transparent heat resistive adhesive tape with antistatic performance, comprising:
   a transparent backing film layer;
   an electrically conductive transparent layer disposed on the backing film layer;
   a transparent acrylic adhesive layer disposed on the electrically conductive transparent layer, the transparent acrylic adhesive layer containing a crosslinked mixture of monomers to impart heat resistance to the layer, and wherein the transparent acrylic adhesive layer includes an ionic fluid of a salt of hydroxy alkyl containing ammonium cation (N+$R_3$R—OH) and fluoro imide anion bis(trifluoromethyl sulfonyl) imide, and
   wherein the transparent adhesive tape has a transparency of at least 30% over at least a portion of the wavelengths from 500 to 1600 nm and has a surface resistivity of less than $10^{11}$Ω/sq.

2. The transparent heat resistive adhesive tape according to claim 1, wherein the backing film layer comprises a polyimide film or a polyethylene naphthalate film.

3. The transparent heat resistive adhesive tape according to claim 1, wherein the electrically conductive transparent layer is at least one of poly(3,4-ethylenedioxythiophen) polystyrene sulfonate and a carbon nanotube film.

4. The transparent heat resistive adhesive tape according to claim 1, wherein the monomers for the crosslinked mixture are selected from at least one of ethoxy diethyleneglycol acrylate, methoxy nonaethyleneglycol acrylate, glycidyl methacrylate, 2-hydroxy ethyl acrylate, (meth) acrylic acid, and 4-hydroxy butyl acrylate.

5. The transparent heat resistive adhesive tape according to claim 1, wherein the crosslinked mixture comprises 77 to 93 wt. % of alkyl (meth) acrylate, 0.1 to 13 wt. % of glycidyl (meth) acrylate and 1 to 10 wt. % of (meth) acrylic acid, based on the total weight of the monomers.

6. A transparent heat resistive adhesive tape with antistatic performance, comprising:
   a transparent backing film layer;
   an electrically conductive transparent layer disposed on the backing film layer;
   a transparent acrylic adhesive layer disposed on the electrically conductive transparent layer, the acrylic adhesive layer containing a crosslinked mixture of monomers comprising 77 to 93 wt. % of alkyl (meth) acrylate, 2 to 13 wt. % of glycidyl (meth) acrylate and 1 to 10 wt. % of (meth) acrylic acid, based on the total weight of the monomers, and wherein the transparent acrylic adhesive layer includes an ionic fluid of a salt of hydroxy alkyl containing ammonium cation (N+$R_3$R—OH) and fluoro imide anion bis(trifluoromethyl sulfonyl) imide, and wherein the transparent adhesive tape has a transparency of at least 30% over at least a portion of the wavelengths from 500 to 1600 nm and has a surface resistivity of less than $10^{11}$Ω/sq.

7. A method of using a transparent heat resistive adhesive tape, comprising:
   providing the transparent heat resistive adhesive tape on an electrical component; and
   inspecting the electrical component through the transparent heat resistive adhesive tape,
   wherein the adhesive tape comprises:
   a transparent backing film layer;
   an electrically conductive transparent layer disposed on the backing film layer;
   a transparent acrylic adhesive layer disposed on the electrically conductive transparent layer, the acrylic adhesive layer containing a crosslinked mixture of monomers to impart heat resistance to the layer, and wherein the transparent acrylic adhesive layer includes an ionic fluid of a salt of hydroxy alkyl containing ammonium cation (N+$R_3$R—OH) and fluoro imide anion bis(trifluoromethyl sulfonyl) imide, and
   wherein the transparent adhesive tape has a transparency of at least 30% over at least a portion of the wavelengths from 500 to 1600 nm and has a surface resistivity of less than $10^{11}$Ω/sq.

* * * * *